United States Patent
Vertriest

(10) Patent No.: US 7,691,183 B2
(45) Date of Patent: Apr. 6, 2010

(54) METHOD FOR DRYING COMPRESSED GAS AND DEVICE USED THEREBY

(75) Inventor: Danny Etienne Andrée Vertriest, Kontich (BE)

(73) Assignee: Atlas Copco Airpower Naamloze Vennootschap, Wilrijk (BE)

( * ) Notice: Subject to any disclaimer, the term of this patent is extended or adjusted under 35 U.S.C. 154(b) by 152 days.

(21) Appl. No.: 11/667,351

(22) PCT Filed: Oct. 20, 2005

(86) PCT No.: PCT/BE2005/000149

§ 371 (c)(1), (2), (4) Date: May 9, 2007

(87) PCT Pub. No.: WO2006/050582

PCT Pub. Date: May 18, 2006

(65) Prior Publication Data

US 2007/0295205 A1 Dec. 27, 2007

(30) Foreign Application Priority Data

Nov. 10, 2004 (BE) .................................. 2004/0553

(51) Int. Cl.
*B01D 53/02* (2006.01)
(52) U.S. Cl. .............................. 95/119; 95/99; 95/118; 95/125; 95/148; 96/108; 96/121; 96/122
(58) Field of Classification Search .................. 96/108, 96/121, 122; 95/119, 118, 99, 125, 148
See application file for complete search history.

(56) References Cited

U.S. PATENT DOCUMENTS

| | | | | |
|---|---|---|---|---|
| 1,934,075 A | * | 11/1933 | Lewis ........................... | 95/100 |
| 1,948,779 A | * | 2/1934 | Abbott et al. .................. | 95/120 |
| 1,959,389 A | * | 5/1934 | Shoosmith .................... | 96/122 |
| 2,747,681 A | * | 5/1956 | Schuftan et al. ............... | 96/122 |
| 3,205,638 A | * | 9/1965 | Hagle ............................ | 95/14 |
| 3,446,479 A | * | 5/1969 | Boldt ..................... | 251/315.08 |
| 3,568,406 A | * | 3/1971 | Dynes .......................... | 95/115 |
| 4,104,039 A | * | 8/1978 | Kuri et al. ...................... | 95/98 |
| 4,283,212 A | * | 8/1981 | Graham et al. ................ | 62/636 |
| 4,761,968 A | * | 8/1988 | Basseen et al. ............... | 62/271 |
| 4,898,599 A | * | 2/1990 | Settlemyer .................... | 95/92 |
| 5,658,369 A | * | 8/1997 | Kusay ........................... | 95/41 |
| 6,171,377 B1 | | 1/2001 | Henderson | |
| 6,221,130 B1 | | 4/2001 | Kolodziej et al. | |
| 6,375,722 B1 | * | 4/2002 | Henderson et al. ........... | 96/112 |
| 2003/0188542 A1 | * | 10/2003 | Vertriest ........................ | 62/93 |
| 2003/0233941 A1 | | 12/2003 | Battershell et al. | |

* cited by examiner

FOREIGN PATENT DOCUMENTS

EP  1 010 452 A1  6/2000

*Primary Examiner*—Jason M Greene
*Assistant Examiner*—Anthony Shumate
(74) *Attorney, Agent, or Firm*—Bacon & Thomas, PLLC

(57) ABSTRACT

Method for drying the compressed gas of a compressor device (1) having at least two pressure stages (4-5), whereby a dryer (3) is used with at least two pressure vessels (9-12) which are filled with a desiccant and which work alternately, such that when one pressure vessel (12) is in action to dry the compressed gas, the other pressure vessel (9) is being regenerated, whereby, in order to regenerate the other pressure vessel (9), at least a part of this compressed gas is guided through the regenerating pressure vessel (9), and at least at the end of the regeneration cycle, this part of the compressed gas, after its passage through the regenerating pressure vessel, is guided to the pressure pipe (6) between two pressure stages (4-5).

8 Claims, 3 Drawing Sheets

METHOD FOR DRYING COMPRESSED GAS AND DEVICE USED THEREBY

FIELD OF THE INVENTION

The present invention concerns a method for drying compressed gas, in particular compressed gas coming from a compressor device with a compressor having at least two pressure stages connected in series.

BACKGROUND

It is already known, in order to dry compressed gas, to make use of a dryer having at least two pressure vessels which are filled with a desiccant or drying agent, which pressure vessels work alternately, such that when one pressure vessel is in action to dry the compressed gas, the other pressure vessel is being regenerated, whereby, in order to dry the compressed gas, this gas is first cooled in a cooler and is then sent through the drying pressure vessel and whereby, in order to regenerate the other pressure vessel, at least a part of this compressed gas is guided counterflow through the regenerating pressure vessel.

Also, it is already known to use, at the end of the regeneration cycle of the regenerating pressure vessel, a part of the compressed gas to cool the regenerated or almost regenerated drying agent by making this part of the compressed gas expand to the atmospheric pressure first, whereby this expanded gas, after its passage through the regenerating pressure vessel, is blown off in the atmosphere.

An advantage of cooling the drying agent in the regenerating pressure vessel at the end of the regeneration cycle is that, at the time the pressure vessels switch over, whereby the regenerated pressure vessel becomes drying pressure vessel and vice versa, temperature and dew point peaks of the compressed gas are avoided.

A disadvantage of this known method, however, is that relatively large amounts of compressed air are lost in the atmosphere and that blowing off already compressed air to an atmospheric pressure entails large energy losses, which may lead to considerable extra costs in the case of a compressor device with a large capacity.

SUMMARY

Also, the invention aims to remedy the above-mentioned and other disadvantages by providing a method which makes it possible to cool the drying agent in the regenerating pressure vessel in a more economical manner and with less losses at the end of the regeneration phase.

To this end, the invention concerns a method for drying the compressed gas of a compressor device with a compressor having at least two pressure stages connected in series, whereby a dryer is used with at least two pressure vessels which are filled with a desiccant or drying agent, which pressure vessels work alternately, such that when one pressure vessel is in action to dry the compressed gas, the other pressure vessel is being regenerated, whereby, in order to dry the compressed gas, this gas is cooled first in a cooler and is then sent through the drying pressure vessel and whereby, in order to regenerate the other pressure vessel, at least a part of this compressed gas is guided through the regenerating pressure vessel, and whereby, at least at the end of the regeneration cycle of the regenerating pressure vessel, this part of the compressed gas, after its passage through the regenerating pressure vessel, is guided to the pressure pipe between two pressure stages.

In this manner, the part of the, compressed gas which is used for cooling the drying agent in the regenerating pressure vessel is brought in again between two pressure stages of the compressor, such that there are no losses of compressed air.

Moreover, there is no expansion at an atmospheric pressure, but at a higher pressure prevailing between a high and a low pressure stage of the compressor, such that less compression energy is lost.

In practice, it is found that the energy required to cool the drying agent in the regenerating pressure vessel can be reduced to one third when compared to the known method.

The above-mentioned part of the compressed gas which is used to cool the drying agent in the regenerating pressure vessel is preferably expanded first so as to further cool and dry the drying agent when passing through the regenerating pressure vessel.

The invention also concerns a device which makes it possible to apply the above-described method for drying compressed gas of a compressor having at least two pressure stages connected in series, which device mainly comprises at least two pressure vessels which are filled with desiccant or drying agent, whereby these pressure vessels work alternately, such that when one pressure vessel is in action to dry the compressed gas, the other pressure vessel is being regenerated; a cooler to cool the compressed gas; and pipes with stop cocks which connect the compressor to the above-mentioned pressure vessels, whereby additional pipes and stop cocks are provided which make it possible for at least a part of the compressed gas of the compressor, after its passage through the cooler and pressure vessel in the drying stage, to be guided to the pressure pipe between two pressure stages via the regenerating pressure vessel.

BRIEF DESCRIPTION OF THE DRAWINGS

In order to better explain the characteristics of the invention, the following preferred embodiment is described as an example only without being limitative in any way, with reference to the accompanying drawings in which.

DETAILED DESCRIPTION

Figure 1:
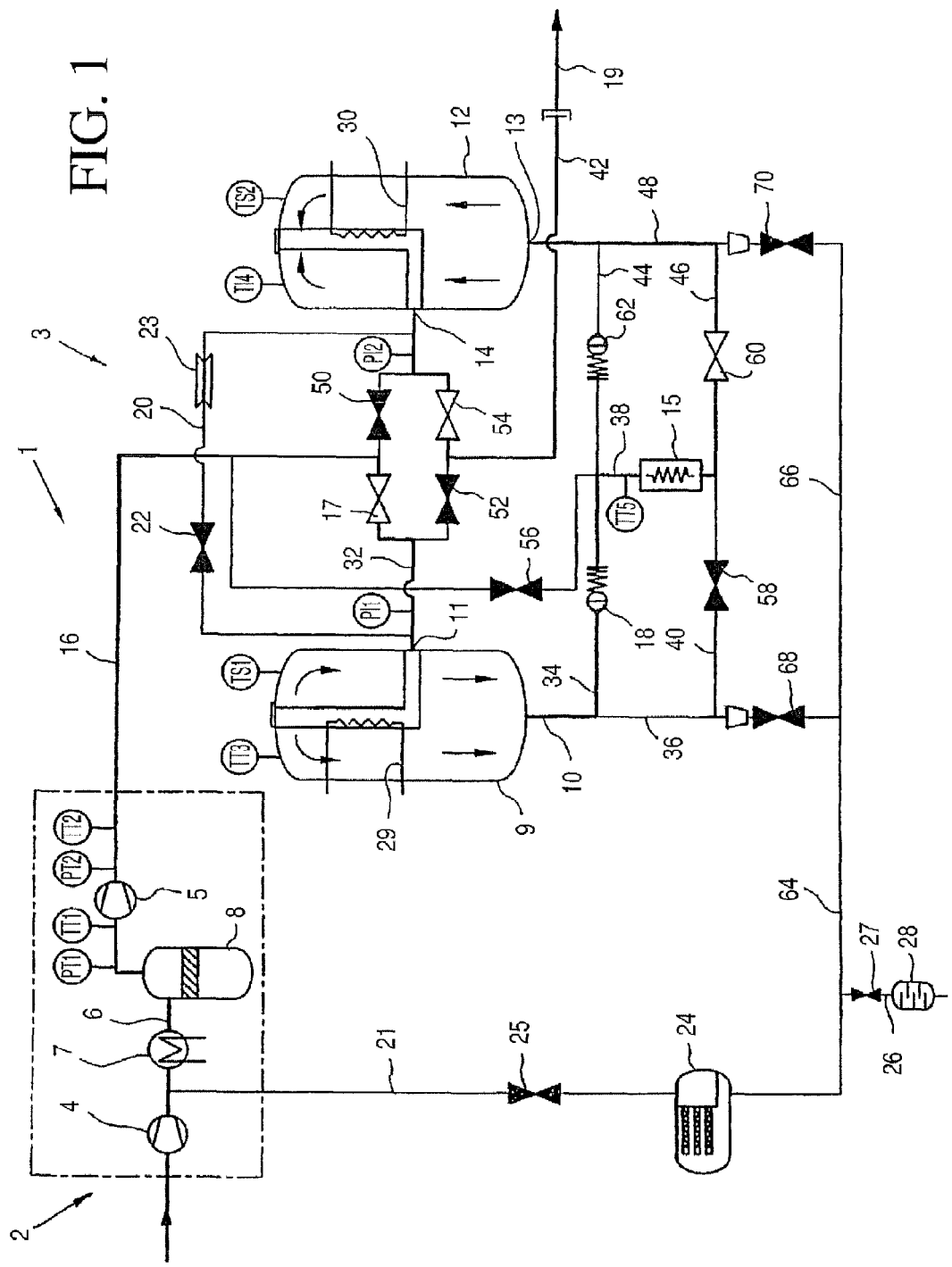
FIG. 1 represents a compressor device provided with a device according to the invention for drying the compressed gas.

FIG. 1 represents a compressor device 1 which mainly consists of a compressor 2 and a drying device 3 according to the invention.

The compressor 2 mainly comprises a low pressure stage 4 and a high pressure stage 5 which are connected in series by means of a pressure pipe 6 in which are successively implemented an intercooler 7 and a water separator 8.

The drying device 3 comprises a first isolated pressure vessel 9 with an inlet 10 and an outlet 11 containing silica gel or any other drying agent; a second isolated pressure vessel 12 with an inlet 13 and an outlet 14 which also contains silica gel as a drying agent; a cooler 15; and pipes 16, 32, 34, 36, 38, 40, 42, 44, 46, 48 with stop cocks 17, 50, 52, 54, 56, 58, 60 and valves 18, 62 which make it possible to connect the compressor 2 to the pressure vessels 9 and 12 to dry the compressed gas and to regenerate the drying agent in the pressure vessels and to make a connection to the consumption network 19.

Additional pipes 20 and 21, 64, 66 respectively and stop cocks 22, 68, 70 are provided which allow at least a part of the hot compressed gas of the compressor 2 to be guided to the pressure pipe 6 via one of the pressure vessels 9 or 12 between the two pressure stages 4 and 5.

The pipe 20 is formed of a bridge which can be blocked between the outlets 11 and 14 of the two pressure vessels 9 and 12, and it comprises a pressure relief valve 23.

The pipes 21, 64, 66 connect each of the inlets 10 and 13 of the pressure vessels 9 and 12 to the pressure pipe 6, more particularly to the part of the pressure pipe 6 at the inlet of the intercooler 7, and it comprises a filter 24 and a valve 25 respectively.

The pipe 64 can be connected to the atmosphere via a tap 26 in which is included a valve 27, and in which a sound absorber can be optionally provided, to bring back the pressure in the regenerating pressure vessel 9 to the pressure in the pressure pipe 6 between two pressure stages 4, 5, and in which is optionally provided a sound absorber 28 as well.

Figure 2:
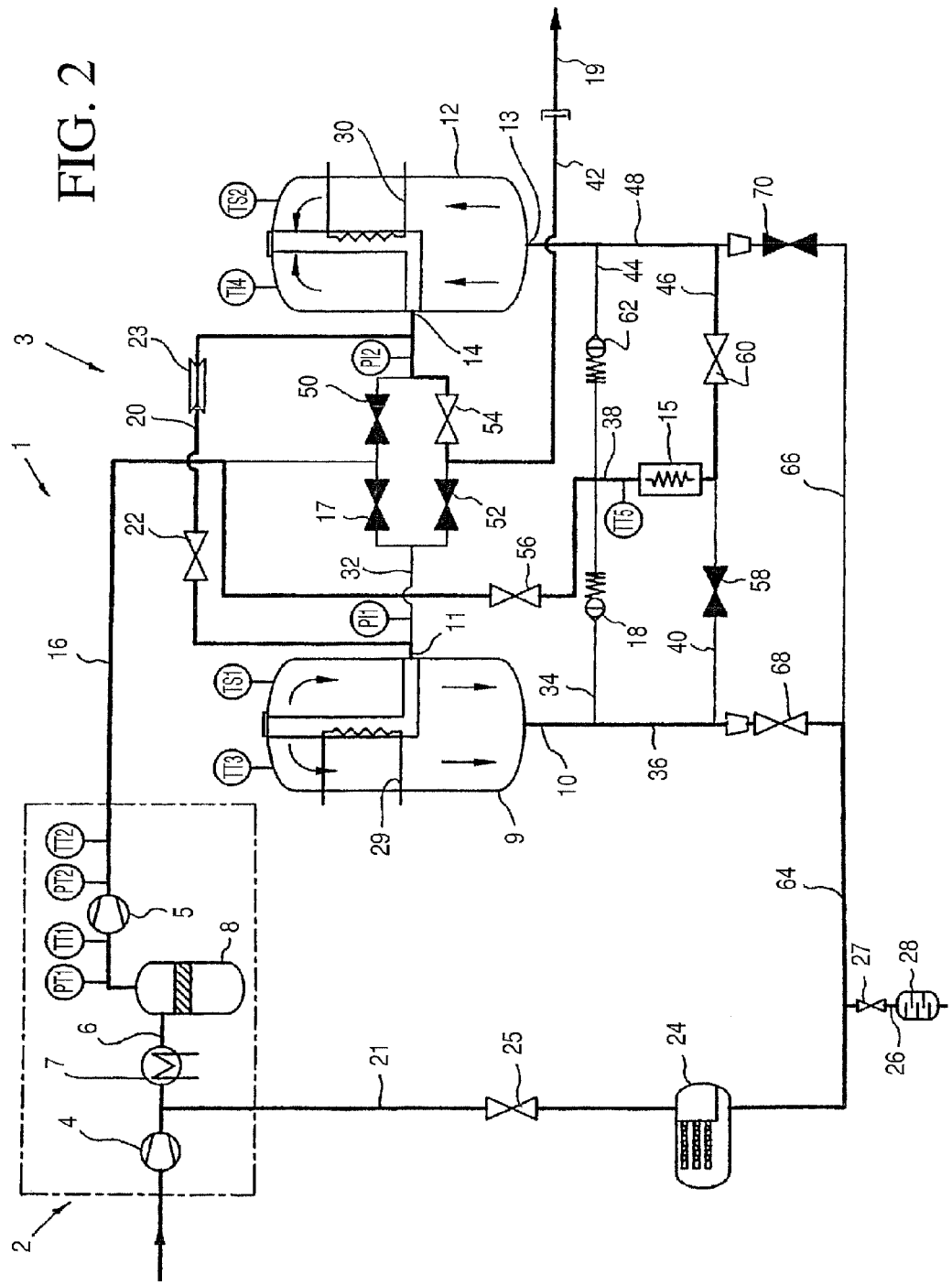
FIGS. 2 and 3 represent the device of FIG. 1, but at other stages of the drying process.
Figure 3:
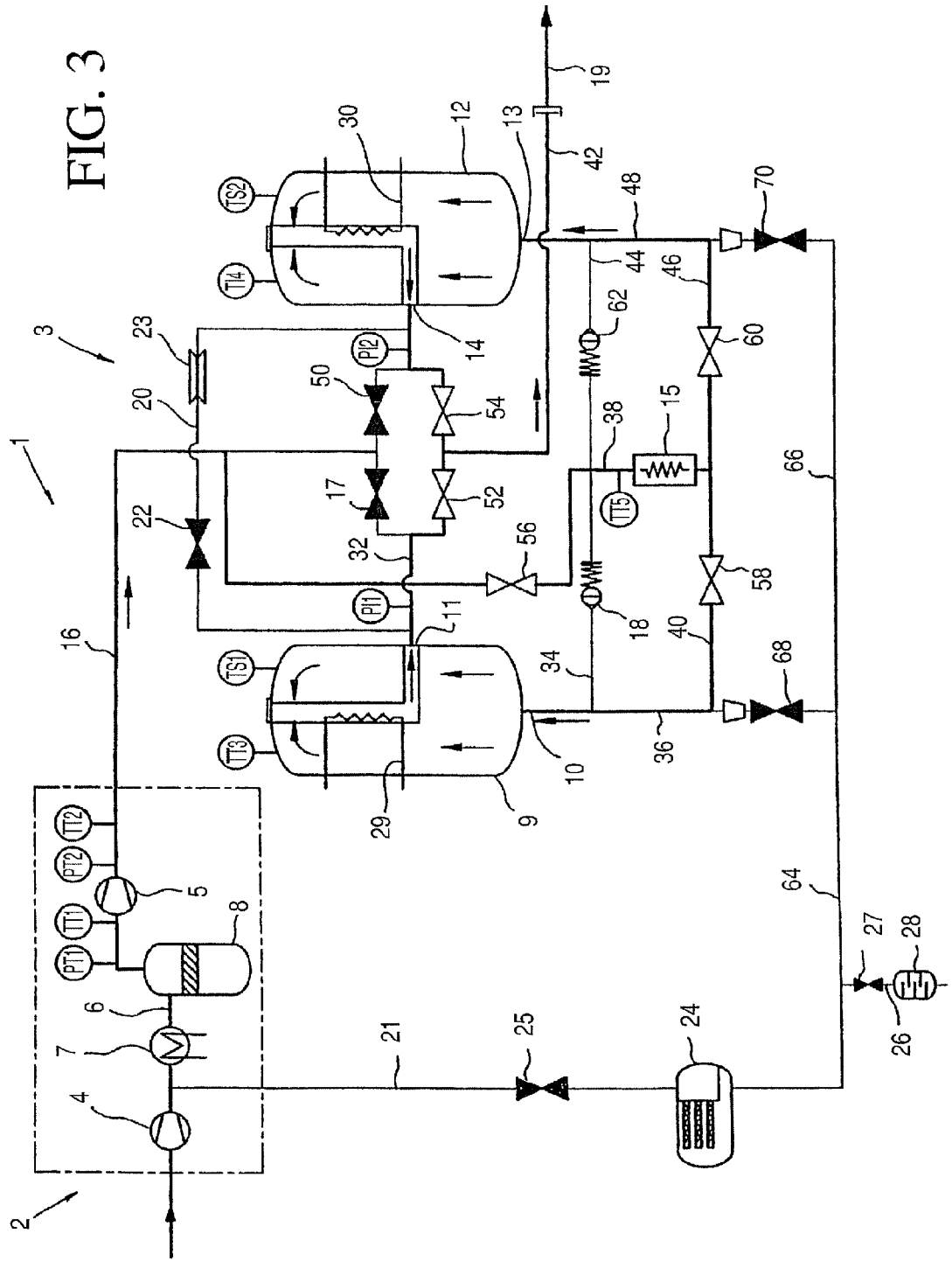

The working of the compressor device 1 and of the dryer 3 is simple and is illustrated by means of FIGS. 1 to 3, whereby the stop cocks 17, 50, 52, 54, 56, 58, 60 and 22, 68, 70 are represented in black in their closed position, and in white in their open position, and whereby the path of the compressed gas is represented in bold.

During a first phase, as represented in FIG. 1, the entire non-cooled compressed gas flow of the compressor 2, more particularly of the high pressure stage 5, is guided counterflow through the pressure vessel 9, where this gas flow will regenerate the drying agent or desiccant material, for example silica gel, making use of the heat contained in the compressed gas.

Next, the compressed gas flow goes to the cooler where it is cooled further, to be then carried through the pressure vessel 12 so as to dry the compressed gas.

The outlet 14 of the pressure vessel 12 is connected to the consumption network 19 at that time, onto which one or several non-represented consumers of compressed air are connected.

During a second phase, at the end of the regeneration cycle of the drying agent in the regenerating pressure vessel 9, according to the invention and as represented in FIG. 2, the entire output of compressed gas is successively guided through the cooler 15 and the pressure vessel 12 to be further dried, after which a part of the cooled gas is supplied to the consumption network 19; the remaining part is guided counterflow through the pressure vessel 9 via the pipes 20 in order to cool the drying agent in the pressure vessel 9, and it is further diverted via the pipes 21, 64, 66 and the filter 24 to the pressure pipe 6 with the intercooler 1.

Before the valve 25 is opened for the cooling, the pressure vessel 9, which needs to be cooled and which is situated at the end pressure, is relieved via valve 27 and sound absorber 28 to a pressure which corresponds to the intercooler 7, in order to prevent a pressure impulse being created towards the intercooler 7.

The part of the gas output which flows through the regenerating pressure vessel 9 to cool the drying agent is relieved at the pressure relief valve 23, which may result in an additional cooling.

This part of the gas output opens into the inlet of the intercooler 7 and is subsequently compressed again by the high pressure stage 5. Thus, no compressed gas will get lost and the energy required to compress the gas, up to the level of the intercooler pressure, which amounts for example to 3 bar, is recovered.

The pressure relief valve 23 is preferably selected such or is set such that the expanse of the gas from the nominal end pressure at the outlet of the compressor 2, which end pressure is for example 8 bar, to the intercooler pressure of for example 3 bar, mainly occurs at the pressure relief valve 23.

The part of the gas output which flows through the regenerating pressure vessel 9 before the drying agent is cooled, is preferably a fraction of the total gas output which is compressed by the compressor 2, whereby this fraction is preferably in the order of magnitude of 6% of the total compressor output.

As is represented in FIG. 3, in a third and final phase, immediately before the pressure vessels are switched, whereby the regenerating pressure vessel 9 becomes the drying pressure vessel and vice versa, the wet compressed gas is distributed for a short time span via the cooler 15 over both pressure vessels 9 and 12. The regenerated pressure vessel 9 is hereby cooled somewhat further and the almost saturated pressure vessel 12 is relieved somewhat.

The result of the second and third phase is a minimal dew point peak and temperature peak at the time of the above-mentioned switching of the pressure vessels 9 and 12.

If necessary, the drying device 3 may be completed with heating elements 29, which are built-in in the pressure vessels 9 and 12 and which can be activated to promote and optimize the drying process.

It is clear that, for the above-mentioned second phase of the drying process, the part of the compressed gas which is used to cool the regenerated or almost regenerated drying agent, must not be necessarily tapped off at the outlet 14 behind the drying pressure vessel 12, although this is preferred.

It is also clear that the compressor 2 may comprise more than two pressure stages 4-5 and that an intercooler 7 is not imperative, whereby the gas which is used for the cooling of the regenerated drying agent may be guided between two successive pressure stages as desired.

It also clear that instead of silica gel as a drying agent, also other desiccants are suitable.

The device 1 and the compressor 2 may possibly be provided with measuring appliances to measure the pressure PT1, PT2, PI1, PI2, the temperature TT1, TT2, TT3, TT4, TT5, the dew point TS1, TS2 and the output, as well as with a non-represented controller to control the cycle of the device 1 and the energy consumption as a function of the required quality of the dry air at the outlet, whereby the stop cocks 17 and 22 are controlled stop cocks in this case which can be controlled by the above-mentioned controller.

Also the pressure relief valve 23 may be set and controlled, if need be, by the above-mentioned controller to make the above-mentioned second and third phase of the drying process pass off optimally.

The invention can also be applied to other types of desiccant dryers, for example to rotating desiccant dryers whereby the pressure vessels are made so to say as separate compartments of one and the same dryer and whereby a common drying agent is used for these compartments which is erected in a rotating manner and which extends partly in each of both compartments, such that the part of the drying agent in one compartment is used to dry the compressed gas, whereas the part of the drying agent in the other compartment is regenerated.

The invention can also be applied in combination with different types of compressors, with oil-free as well as oil-injected compressors.

It is clear that the present invention is not restricted to the above-described method and the device applied thereby, but that it can be applied in all sorts of shapes and combinations while still remaining within the scope of the present invention.

The invention claimed is:

1. Method of drying the compressed gas of a compressor system including at least two pressure stages connected in series by a pressure pipe, and a dryer with at least two pressure vessels which are filled with a desiccant or drying agent, and which pressure vessels work alternately, such that when a first drying pressure vessel is in action to dry the compressed gas, a second regenerating pressure vessel is being regenerated, said method comprising the steps:

in a first, drying phase, in order to regenerate the second pressure vessel, compressed gas is non-cooled and is guided through the second regenerating pressure vessel, and in order to subsequently dry the compressed gas, the compressed gas is cooled first in a cooler without passing through either of the pressure stages and is then sent through the first drying pressure vessel; and in a second, cooling phase, before the end of the regeneration cycle of the second regenerating pressure vessel, a part of the compressed gas that is guided through the second regenerating pressure vessel, is first cooled before being sent through the second regenerating pressure vessel, and, after passing through the second regenerating pressure vessel, is guided to the pressure pipe between said two pressure stages and compressed by one of said pressure stages.

2. Method according to claim 1, wherein the part of the cooled compressed gas that is used to cool a drying agent in the second regenerating pressure vessel is expanded first so as to further cool and dry the drying agent as the gas passes through the second regenerating pressure vessel.

3. Method according to claim 1, wherein the part of the cooled compressed gas that is used to cool a drying agent in the second regenerating pressure vessel, before the gas passes through the second pressure vessel, is expanded to a pressure which is equal to or somewhat larger than the pressure in the pressure pipe between the pressure stages.

4. Method according to claim 1, wherein the part of the cooled compressed gas that is used to cool the drying agent in the second regenerating pressure vessel is tapped off at an outlet of the first drying pressure vessel.

5. Method according to claim 1, wherein in the pressure pipe, between two compressor pressure stages, there is provided an intercooler, and said part of the cooled compressed gas, after passing through the second regenerating pressure vessel, is guided to the inlet of the intercooler.

6. Method according to claim 1, wherein the part of the cooled compressed gas which is used to cool a drying agent in the second regenerating pressure vessel is a fraction of the total gas output which is compressed by the compressor.

7. Method according to claim 6, wherein the fraction is about 6% of the total gas output which is compressed by the compressor.

8. Method according to claim 1, wherein, after the regenerated drying agent has been cooled in the second regenerating pressure vessel, the entire output of compressed gas of the compressor is sent through the cooler, after which the output cooled gas is divided over two inlets of the first and second pressure vessels and is combined at outlets of the first and second pressure vessels for distribution to the consumption network.

* * * * *

(12) EX PARTE REEXAMINATION CERTIFICATE (8760th)
United States Patent
Vertriest

(10) Number: US 7,691,183 C1
(45) Certificate Issued: Dec. 13, 2011

(54) METHOD FOR DRYING COMPRESSED GAS AND DEVICE USED THEREBY

(75) Inventor: Danny Etienne Andrée Vertriest, Kontich (BE)

(73) Assignee: Atlas Copco Airpower Naamloze Vennootschap, Wilrijk (BE)

Reexamination Request:
No. 90/011,562, Mar. 11, 2011

Reexamination Certificate for:
Patent No.: 7,691,183
Issued: Apr. 6, 2010
Appl. No.: 11/667,351
Filed: May 9, 2007

(22) PCT Filed: Oct. 20, 2005

(86) PCT No.: PCT/BE2005/000149

§ 371 (c)(1),
(2), (4) Date: May 9, 2007

(87) PCT Pub. No.: WO2006/050582

PCT Pub. Date: May 18, 2006

(30) Foreign Application Priority Data

Nov. 10, 2004 (BE) ............................................. 2004/0553

(51) Int. Cl.
*B01D 53/02* (2006.01)

(52) U.S. Cl. ................................. 95/119; 95/99; 95/118; 95/125; 95/148; 96/121; 96/122

(58) Field of Classification Search ........................ None
See application file for complete search history.

(56) References Cited

To view the complete listing of prior art documents cited during the proceeding for Reexamination Control Number 90/011,562, please refer to the USPTO's public Patent Application Information Retrieval (PAIR) system under the Display References tab.

*Primary Examiner* — Norca L Torres Velazquez

(57) ABSTRACT

Method for drying the compressed gas of a compressor device (1) having at least two pressure stages (4-5), whereby a dryer (3) is used with at least two pressure vessels (9-12) which are filled with a desiccant and which work alternately, such that when one pressure vessel (12) is in action to dry the compressed gas, the other pressure vessel (9) is being regenerated, whereby, in order to regenerate the other pressure vessel (9), at least a part of this compressed gas is guided through the regenerating pressure vessel (9), and at least at the end of the regeneration cycle, this part of the compressed gas, after its passage through the regenerating pressure vessel, is guided to the pressure pipe (6) between two pressure stages (4-5).

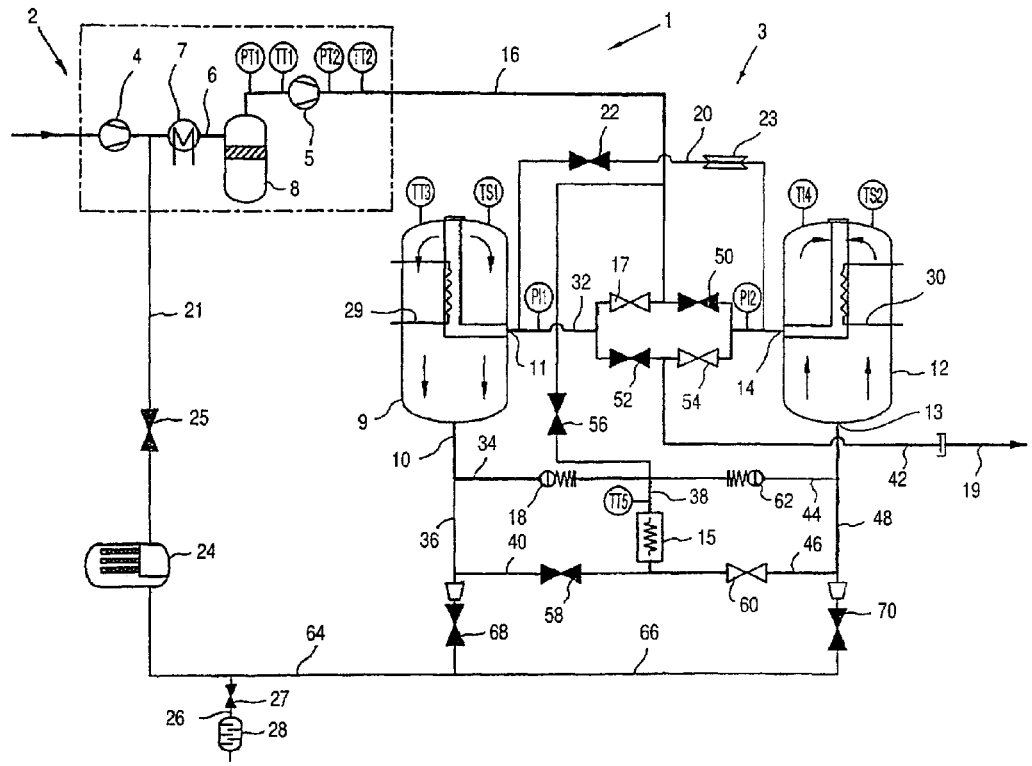

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *